(12) United States Patent
Schanen et al.

(10) Patent No.: US 9,152,453 B2
(45) Date of Patent: Oct. 6, 2015

(54) TRANSFERRING OWNERSHIP PRIVILEGES

(75) Inventors: Brian Schanen, Commerce Township, MI (US); Douglas Robert Redmond, Brighton, MI (US); Irvin Fay Hayes, Jr., Ypsilanti, MI (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 13/306,799

(22) Filed: Nov. 29, 2011

(65) Prior Publication Data

US 2012/0137007 A1 May 31, 2012

Related U.S. Application Data

(60) Provisional application No. 61/417,862, filed on Nov. 29, 2010.

(51) Int. Cl.
*G06F 15/173* (2006.01)
*G06F 7/00* (2006.01)
*G06F 9/46* (2006.01)
*H04L 29/08* (2006.01)

(52) U.S. Cl.
CPC .......... *G06F 9/468* (2013.01); *H04L 29/08072* (2013.01)

(58) Field of Classification Search
USPC .......................................... 707/610; 709/223
See application file for complete search history.

(56) References Cited

U.S. PATENT DOCUMENTS

| | | | | |
|---|---|---|---|---|
| 2007/0299877 | A1* | 12/2007 | Cohen et al. | 707/104.1 |
| 2008/0300943 | A1* | 12/2008 | Simpson et al. | 705/8 |
| 2011/0045808 | A1* | 2/2011 | Issa et al. | 455/414.1 |
| 2011/0153560 | A1* | 6/2011 | Bryant et al. | 707/610 |
| 2011/0167036 | A1* | 7/2011 | Liebman | 707/608 |
| 2011/0258214 | A1* | 10/2011 | Shu | 707/769 |
| 2012/0030187 | A1* | 2/2012 | Marano et al. | 707/709 |

OTHER PUBLICATIONS

"Oracle8 Replication," Release 8.0, Dec. 1997, Part No. A58245-01, 568 pages.

\* cited by examiner

*Primary Examiner* — Emmanuel L Moise
*Assistant Examiner* — Mahran Abu Roumi
(74) *Attorney, Agent, or Firm* — Fish & Richardson P.C.

(57) ABSTRACT

Methods, systems, and apparatus, including computer programs encoded on a computer storage medium, for transferring ownership privileges. In one aspect, a method includes identifying an ownership privilege in a system that permits users to acquire a write lock on one or more resources in a plurality of resources. The ownership privilege for a first plurality of users located in a first geographic region is revoked based at least partly on a determination that a current time of day in a different, second geographic region satisfies a criteria. The ownership privilege is granted to a different second plurality of users located in the second geographic location responsive to the determination.

13 Claims, 4 Drawing Sheets

TRANSFERRING OWNERSHIP PRIVILEGES

CROSS-REFERENCE TO RELATED APPLICATIONS

This application claims the benefit under 35 U.S.C. §119 (e) of U.S. Provisional Application Ser. No. 61/417,862, filed on Nov. 29, 2010 entitled "TRANSFERRING OWNERSHIP PRIVILEGES," the entirety of which is hereby incorporated by reference.

BACKGROUND

This specification relates to digital data processing and, in particular, to document management systems.

Data management systems store and control access to resources such as files and other types of data. Distributed data management systems provide access to resources for users in remote locations. Users can access files through a network such as the Internet. Files may be stored on a remote server, or they may be replicated at various times to other servers throughout the network.

SUMMARY

This specification describes technologies relating to data management.

In general, one innovative aspect of the subject matter described in this specification can be embodied in methods that include the actions of identifying an ownership privilege in a system that permits users to acquire a write lock on one or more resources in a plurality of resources; determining that a current time of day in a different, second geographic region satisfies a criteria; revoking the ownership privilege for a first plurality of users located in a first geographic region based at least in part on the determination that the current time of day in the different, second geographic region satisfies the criteria; and granting the ownership privilege to a different second plurality of users located in the second geographic location responsive to the determination. Other embodiments of this aspect include corresponding systems, apparatus, and computer programs, configured to perform the actions of the methods, encoded on computer storage devices.

These and other embodiments can each optionally include one or more of the following features. The actions further include denying a write lock request from a user in the first plurality of users for a resource in the plurality of resources based at least partly on the ownership privilege. The actions further include granting a write lock request to a user in the second plurality of users for a resource in the plurality of resources based at least partly on the ownership privilege. The resource is an electronic file. The resource is an attribute of the system. The criteria is satisfied if the current time of day is equal to a specified time in a time zone of the second geographic region, or if the current time of day is within a specified time range in the time zone. The determination is further based on determining that a lifecycle state of a resource in the plurality of resources has changed. The actions further include altering one or more properties of one or more of the resources responsive to the determination. A property in the one or more properties is a version or an office location. A geographic region is a continent, a country, a state, a city, or a building.

Particular embodiments of the subject matter described in this specification can be implemented so as to realize one or more of the following advantages. A data management system with rolling ownership privileges prevents inconsistent data from arising in the system, especially in replicated environments. Rolling ownership privileges also allow global teams of users to more easily collaborate on projects. Properties other than ownership can be automatically transferred along with ownership privileges.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A data management system accessible by multiple users requires certain control measures to be implemented in order to maintain consistency of files in the system. Absent basic control measures, multiple users who modify the same file at the same time will experience inconsistent results.

An ownership privilege in a data management system permits users who hold the ownership privilege to perform various actions on resources in the system. For example, a user granted an ownership privilege for a file can perform actions such as requesting a write lock on the file, checking out the file, and checking in the file. Acquiring a write lock on a file allows a user to modify the file. Checking out a file reserves a file for modification by a user and can optionally create a local copy of the file for modification. Checking in a file copies a modified version of the file into the data management system. Users who do not have ownership privileges on a file are not permitted to perform these actions.

In a distributed data management system, resources are accessible by multiple users in multiple locations. The locations may be remote from each other, and resources stored by the system may be replicated to storage servers at each location.

Figure 1:
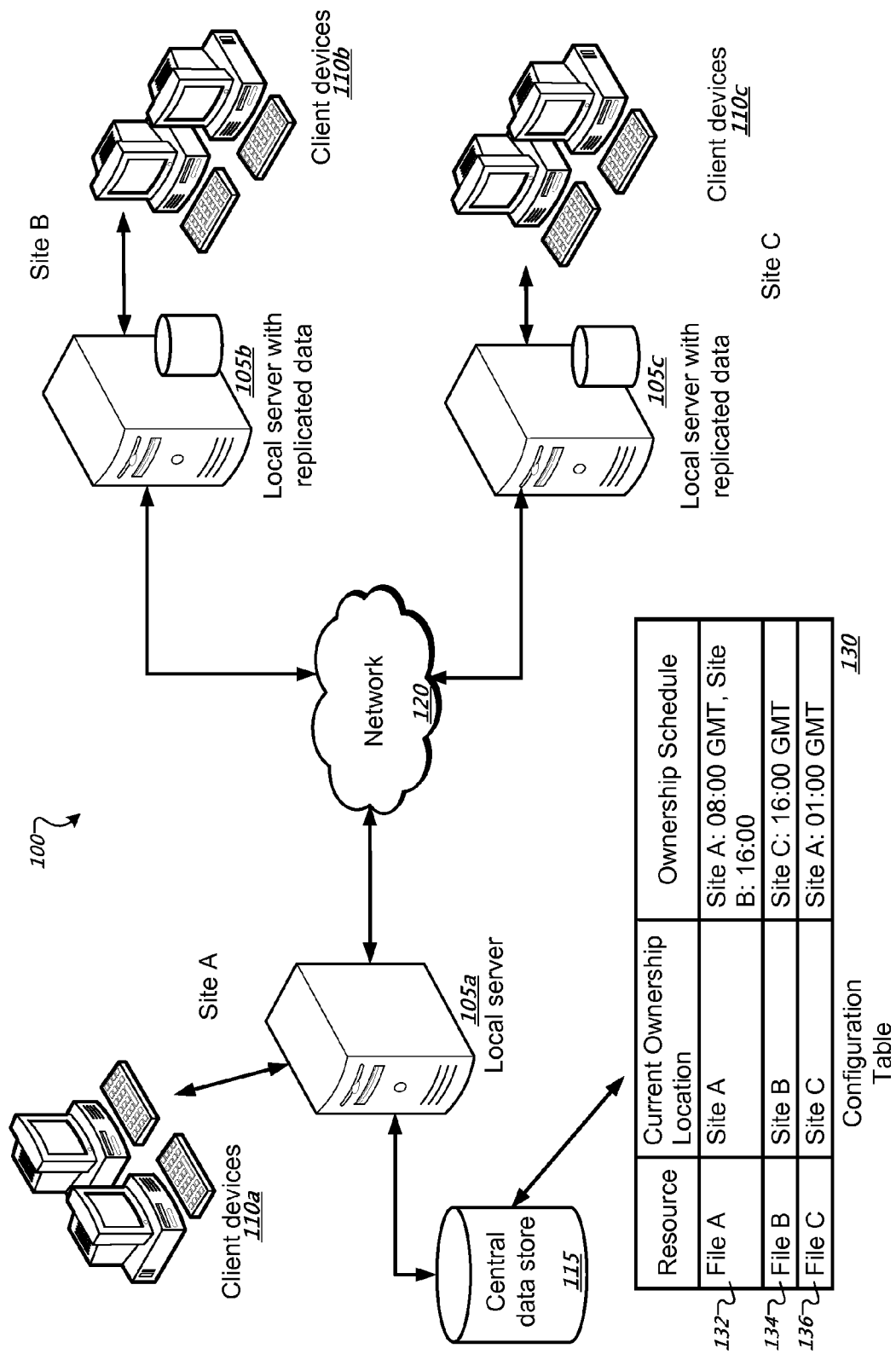
FIG. 1 is a diagram of an example data management system 100.

FIG. 1 is a diagram of an example data management system 100. The data management system 100 provides access to resources through a network. In various implementations, resources include files, electronic documents, directories, subdirectories, databases, devices, and network locations. A resource can be stored in a portion of an electronic file (e.g., a web page or other document) that holds other resources, in a single electronic file dedicated to the resource in question, or in multiple coordinated electronic files. Moreover, a resource can be stored in a memory without having first been stored in file. client devices 110a can request access to resources stored in a central data store 115 from a server 105a. The client devices are data processing apparatus (e.g., personal computers, laptop computers, smartphones, tablet computers, and Internet-enabled televisions) coupled to the server through a network 120 such as a local area network (LAN) or wide area network (WAN), e.g., the Internet. The server 105a is one or more data processing apparatus (e.g., a server system, a cluster of server systems) that provides access resources in the central data store 115. In some implementations, the central data store 115 is a database or corpus of resources.

Other local servers 105*b* and 105*c* in the data management system 100 can communicate with each other and the local server 105*a* through the network 120. The local servers 105*b* and 105*c* may be in geographical locations that are different from each other and different from the location of local server 105*a*. By way of illustration, the local server 105*a* may be located at one work site, while the local servers 105*b* and 105*c* may be located at different work sites.

Data from the central data store 115 can be replicated to the other local servers 105*b* and 105*c* in the data management system 100. Data replication allows local client devices to access a local copy of resources. For example, client devices 110*b* can request a local copy of a resource from local server 105*b*. Likewise, client devices 110*c* can request a local copy of a resource from local server 105*c*.

Servers in the data management system 100 can at various times update the replicated data that is stored locally. For example, local server 105*a* can send a copy of resources from the central data store 115 through the network 120 to each local server 105*b* and 105*c* for replication.

If multiple users attempt to modify a resource in the data management system 100, the system 100 can ensure that resource in the system 100 remains consistent. The system 100 can associate an ownership privilege with each resource. In various implementations, users that attempt to perform certain actions on a set of resources must first have the ownership privilege for the set of resources. For example, a user of client device 110*a* may request a write lock on the resource "File A". A write lock is a resource attribute that must be acquired before a user is allowed to modify the resource. In various implementations, only one user can hold a write lock for a given resource at any time. In some implementations, one write lock is available for each resource, and attempts to request an unavailable write lock will be unsuccessful. A write lock can be implemented as a semaphore, for instance, in which attempts to request the write lock are placed in a waiting queue.

The system 100 can require a user to have an ownership privilege for a resource before the system allows the user to acquire a write lock on the resource. If a user does not have ownership of a resource before requesting a write lock on the resource, the request will be denied, even if no other users have acquired the write lock. In some implementations, an ownership privilege cannot be automatically revoked for a user who has acquired the write lock for a particular resource.

Ownership privileges can be associated with various types of resources in a data management system 100. Resources may also include various attributes of the data management system 100. Attributes of the system can include configuration information, e.g., user information, storage space available, or permissions information, including configuration of ownership privileges. For example, the system 100 may require a system administrator to have ownership privileges before acquiring a write lock on system configuration information.

Allocation of ownership privileges can be accomplished in various ways. Ownership privileges can, for example, be allocated on a per-work-site basis. In other words, the system 100 can allocate ownership of a particular set of resources to all users at a single work site. For example, users of client devices 110*a* may normally access client devices 110*a* at the same work site, Site A. The system can either allocate ownership to all users who normally work at Site A, or the system can allocate ownership to users of client devices 110*a* located at Site A. Users at Site A will then be permitted to acquire available write locks on these resources, while users at Site B will not be permitted to acquire available write locks on these resources. Other allocations of ownership privileges are possible. For example, ownership may be allocated by continent, by country, by state, by city, or by building.

In some implementations, the system can keep track of ownership privileges with a configuration table 130, for example. The configuration table 130 maintains records of which groups of users currently have ownership of the various resources. The groups of users may be organized by location. For example, entry 132 of configuration table 130 indicates that the resource "File A" has its ownership privileges allocated to Site A. Entry 134 indicates that the resource "File B" has its ownership privileges allocated to Site B, and entry 136 indicates that "File C" has its ownership privileges allocated to Site C. Each of Sites A-C may correspond to different office locations in different geographic regions.

In some implementations, the system 100 can reallocate ownership privileges among the various work sites based on a time schedule. The time schedule can be stored in a configuration table used to store ownership privilege information. For example, entry 132 of configuration table 130 indicates that ownership privileges for File A should be transferred to Site A at 08:00 Greenwich Mean Time ("GMT") and Site B at 16:00 GMT. Entry 134 of configuration table 130 indicates that Site B currently has ownership privileges for File B, but that ownership privileges will be transferred to Site C at 16:00 GMT. Entry 136 of configuration table 130 indicates that Site C currently has ownership privileges for File C, but that ownership privileges will be transferred to Site A at 01:00 GMT.

In some implementations, the system 100 transfers the ownership privilege using a time schedule based on the time zones of various geographic regions. For example, the system can allocate ownership privileges for a group of resources such that the ownership privileges are transferred to sites in geographic regions where the work day is currently in progress. The system can transfer ownership privileges if the current time of day in one geographic region is equal to a specified time in the time zone of a second geographic region. The system can also transfer ownership privileges if the current time of day is within a specified time range in the time zone of a geographic region. The system 100 can, for example, transfer ownership privileges from a site in North America at the end of the work day in North America to a site in Asia, where the work day is starting.

In some implementations, the system 100 can also allow users to request ownership privileges when they do not currently hold ownership privileges. The system 100 thus can grant ownership privileges for a fixed time period, for instance. For example, when a user requests ownership privileges, the system 100 can grant the user ownership privileges for four hours. If the user has not acquired the write lock on that particular resource when the four hours ends, ownership may be automatically transferred elsewhere.

In some implementations, the system 100 can maintain a queue of users who have requested ownership privileges. When one user relinquishes ownership either manually or by expiration of the time period for the user's ownership privileges, ownership privileges can be automatically transferred by the system 100 to the next user in the queue. If no users remain in the queue, ownership privileges can remain with the previous user who requested ownership privileges.

Figure 2:
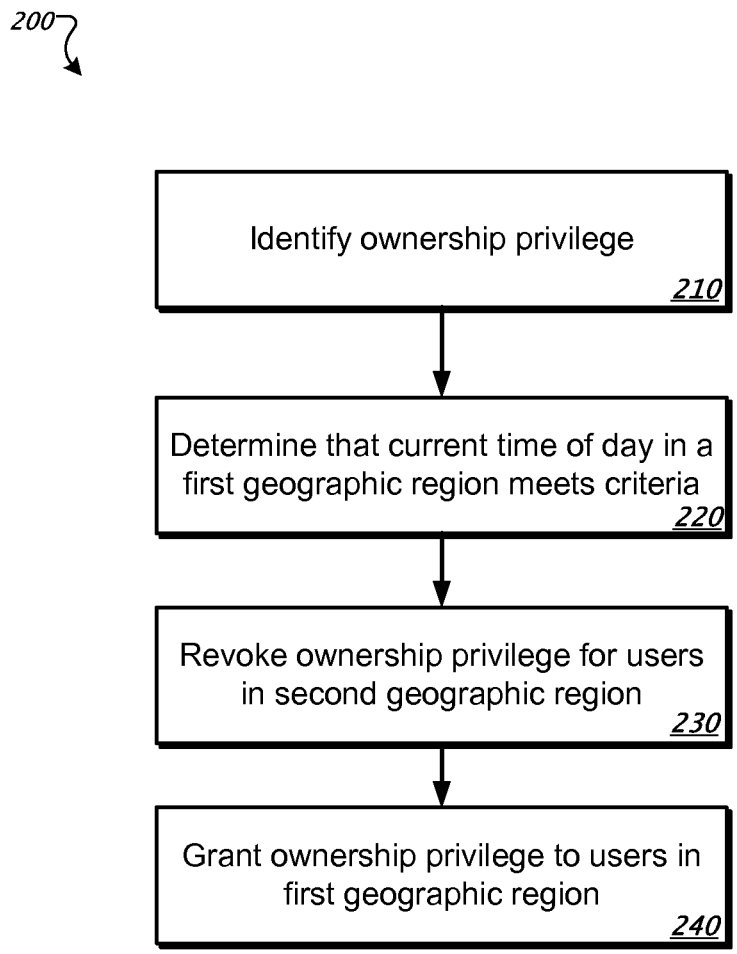
FIG. 2 is a flow chart of an example technique for transferring ownership privileges by a data management system.

FIG. 2 is a flow chart of an example technique 200 for transferring ownership privileges by a data management system. The technique 200 can be implemented as computer software instructions that are performed by one or more data processing apparatus. The system (e.g., system 100) identifies an ownership privilege for resources in the system (210). As described above, ownership privileges can, for example, be allowed on a per-work-site basis or by geographic region. For example, the system (e.g., system 100) can identify an ownership privilege by referring to a configuration table (e.g. configuration table 130). Other ways of identifying an ownership privilege are possible, such as querying a database or other servers in the system.

The system determines that a current time of day in a geographic region meets a criteria (220). The time of day can be measured by a system time maintained or acquired by the system. The time of day can either be expressed as hours and minutes of the current time in a time zone, or the time of day can be expressed as the number of seconds (or minutes or hours) since a certain event. For example, the time of day can be expressed as the number of seconds that have passed since Jan. 1, 1970.

Determining that a current time of day meets a criteria can include determining that a current time of day is beyond a specified time. For example, the system can determine that the current time of day is 04:01 GMT and that a specified time was 04:00 GMT. In some implementations, the system can compare the current time of day to a range of specified times. For example, the specified range can be between 04:00 GMT and 12:00 GMT. If the current time of day is after 04:00 GMT but before 12:00 GMT, the system can determine that the criteria is met. The times can be relative to the start of the same day or different days. In some other implementations, the criteria is met when the current time of day expressed in seconds or minutes matches a specified time of day expressed in seconds or minutes. Other ways of determining that a current time of day in a geographic region meets a criteria are possible.

For example, the system can determine that a current time of day meets a criteria because the current time of day falls within a times defining a work day in a particular geographic region. The system can in response transfer ownership privileges from one group of users to another. The work day in a particular geographic region can be specified by a range of times. For example, the work day in a particular geographic region can be defined as occurring between 08:00 GMT and 17:00 GMT. If a current system time is after 08:00 and before 17:00 GMT, the system can transfer ownership privileges to users in that geographic area. In some implementations, the system repeatedly checks ownership privileges and transfers ownership privileges accordingly if transfer has not yet properly occurred.

The system can also determine whether the criteria is satisfied based on a lifecycle state change of the resource. A lifecycle state change represents a change in the status of the resource. A lifecycle state change can be a modification of the file, a change in a version number of the file, or a move/rename of the file. Lifecycle state changes also represent changes in the developmental stage of the file, and can for example be from a reviewing state to a voting state or from a testing state to an integration state.

The system revokes ownership privileges for users located in a first geographic region based on the determination that a current time of day in a second geographic region satisfies a criteria (230). Revoking ownership privileges for a group of users prevents the users from acquiring a write lock to a resource, even if the write lock is otherwise available. They may in effect reserve the resource for users in a site to which ownership privileges were transferred. Users without ownership privileges can still read files for which they do not have ownership privileges.

The system grants ownership privileges to users located in the second geographic region (240). The system can, for example, transfer ownership privileges by granting ownership privileges to users in a geographic region where the work day is starting.

If users in the second geographic region request a write lock on a resource for which ownership privileges have transferred, the request will be unsuccessful. If users in the first geographic region request a write lock on a resource for which ownership privileges have transferred, the request will be successful if the write lock is available. In some implementations, if a user in the second geographic region had already acquired a write lock while holding ownership privileges on a resource, the ownership privileges will not be automatically transferred to the first geographic region until the write lock is released.

When granting and revoking ownership privileges, the system can update system properties associated with the resource. For example, a configuration table can be updated to indicate a site or geographic region of users that currently have ownership privileges. The system can also update a version number of a file, for example, based on an ownership change initiated by a lifecycle change.

Figure 3:
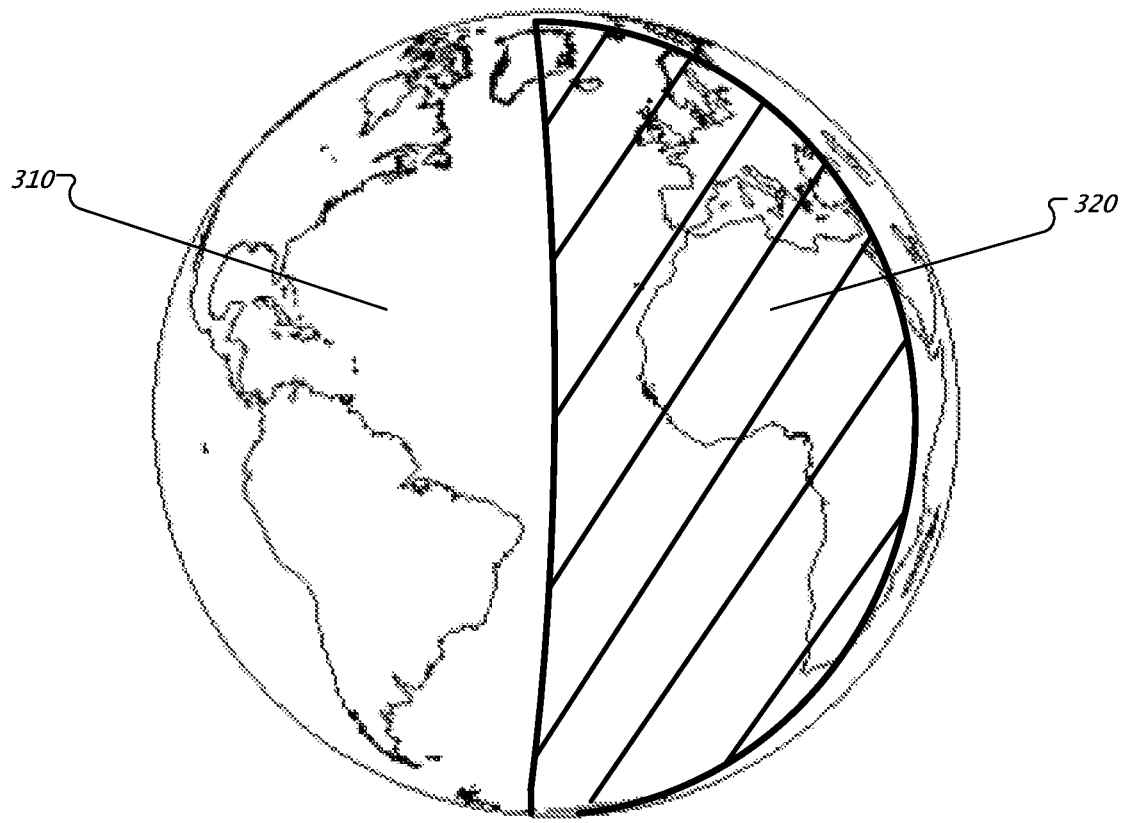
FIG. 3 is a diagram of example geographic regions for transferring ownership privileges.

FIG. 3 is a diagram of example geographic regions for transferring ownership privileges. The data management system may allocate ownership privileges among various regions of the Earth. The regions may be allocated such that users in at least one region always have ownership privileges during their work day. Ownership privileges can, for example, be transferred to users in geographic region 320 at the start of the work day in that region. While ownership privileges for a set of resources are allocated to users in region 320, users in other regions, such as region 310, would not have ownership privileges for those resources. At the end of the work day in region 320, the system can transfer ownership to users in region 310.

Figure 4:
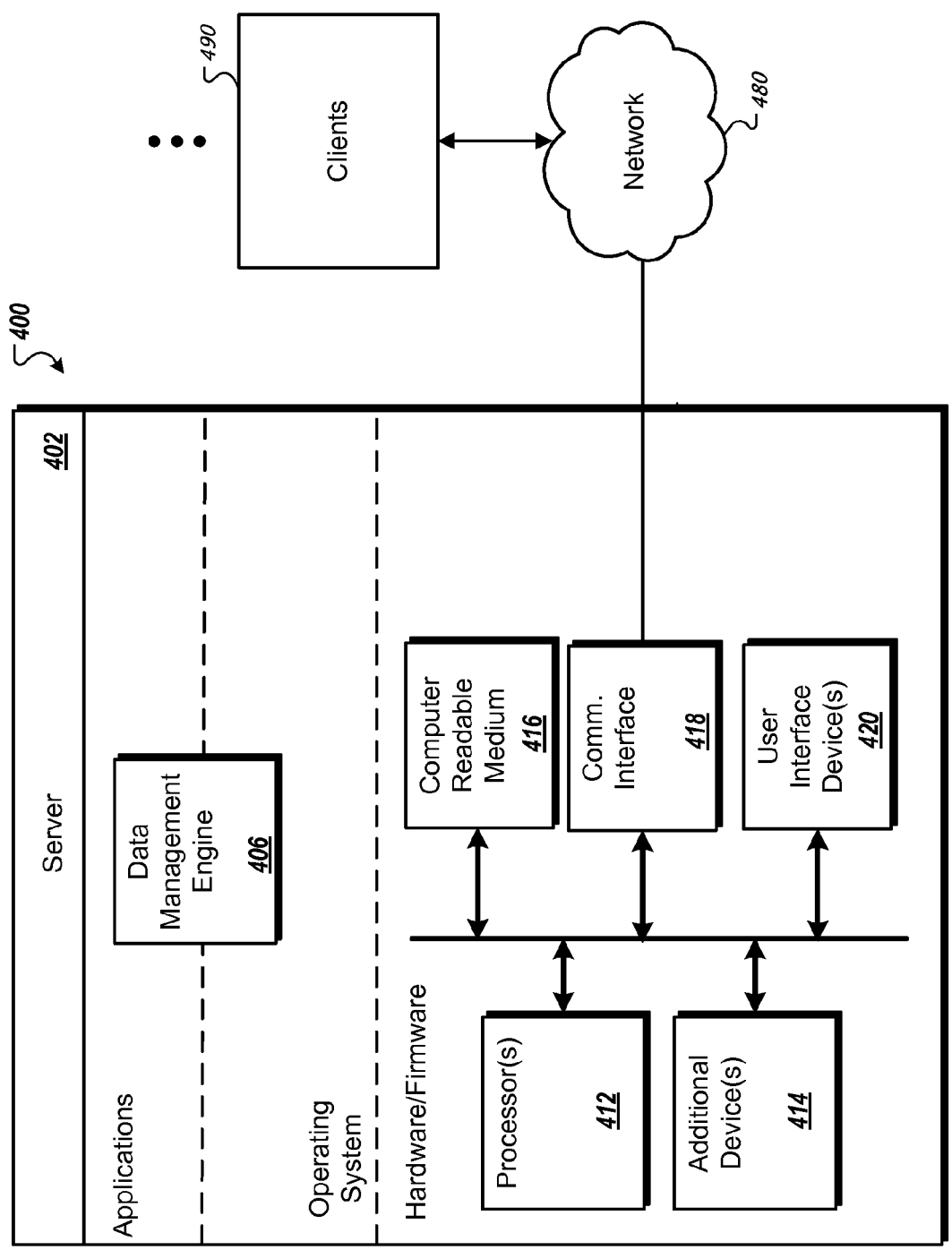
FIG. 4 is a schematic diagram of an example data management system configured to transfer ownership privileges.

FIG. 4 is a schematic diagram of an example data management system configured to transfer ownership privileges. The system 400 generally consists of a server 402. The server 402 is optionally connected to one or more user or client computers 490 through a network 480. The server 402 consists of one or more data processing apparatus. While only one data processing apparatus is shown in FIG. 4, multiple data processing apparatus can be used in one or more locations.

The server 402 includes various modules, e.g. executable software programs, including a data management engine 406. The data management engine can interface with system databases, transfer ownership privileges according to a schedule, maintain a configuration table for ownership privilege transfer, and enforce various other mechanisms to ensure data consistency in the system.

Each module runs as part of the operating system on the server 402, runs as an application on the server 402, or runs as part of the operating system and part of an application on the server 402, for instance. Although several software modules are illustrated, there may be fewer or more software modules. Moreover, the software modules can be distributed on one or more data processing apparatus connected by one or more networks or other suitable communication mediums.

The server 402 also includes hardware or firmware devices including one or more processors 412, one or more additional devices 414, a computer readable medium 416, a communication interface 418, and one or more user interface devices 420. Each processor 412 is capable of processing instructions for execution within the server 402. In some implementations, the processor 412 is a single or multi-threaded processor. Each processor 412 is capable of processing instructions stored on the computer readable medium 416 or on a storage device such as one of the additional devices 414. The server 402 uses its communication interface 418 to communicate with one or more computers 490, for example, over a network 480. Examples of user interface devices 420 include a display, a camera, a speaker, a microphone, a tactile feedback device, a keyboard, and a mouse. The server 402 can store instructions that implement operations associated with the modules described above, for example, on the computer readable medium 416 or one or more additional devices 414, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
   identifying, by a data management system, an ownership privilege for a resource in a system that permits users to acquire a write lock on one or more resources in a plurality of resources, wherein users that do not have the ownership privilege for the resource cannot acquire the write lock on the resource, wherein the ownership privilege for the resource is associated with a first owner in a first geographic region;
   receiving, by the data management system, a request for the write lock on the resource from a second owner in a different second geographic region;
   determining that the second owner in the different second geographic region does not have the ownership privilege;
   in response to determining that the second owner does not have the ownership privilege, adding the second owner to a queue of users who have requested the write lock for the resource without having ownership privileges for the resource;
   determining, by the data management system, that a developmental stage of the resource has changed from a first stage associated with the first owner in the first geographic region to a second stage associated with the different second owner in the different second geographic region;
   in response to determining that the developmental stage of the resource has changed, automatically revoking the ownership privilege for the first owner in the first geographic region;
   determining that the second owner is next in the queue of users who have requested the write lock for the resource without having ownership privileges for the resource;
   in response to determining that the second owner is next in the queue of users who have requested the write lock for the resource without having ownership privileges for the resource, automatically granting the ownership privilege to the second owner in the different second geographic region;
   receiving a request for the write lock on the resource from the first owner, wherein the request for the write lock is a request for the write lock on the resource for which the write lock has not been acquired by another user;
   determining that the first owner does not have the ownership privilege; and
   in response to determining that the first owner does not have the ownership privilege, denying the request for the write lock on the resource from the first owner and adding the first owner to the queue of users who have requested the write lock for the resource without having ownership privileges for the resource.

2. The method of claim 1, further comprising:
   receiving a request for the write lock on the resource from the second user;
   determining that the second user has the ownership privilege; and
   in response to determining that the second user has the ownership privilege, granting the request for the write lock on the resource to the second user.

3. The method of claim 1, wherein the resource is an electronic file.

4. The method of claim 1, wherein the ownership privilege for the resource is an ownership privilege for an attribute of the system.

5. The method of claim 4, wherein the attribute is an element of configuration information or permissions information.

6. The method of claim 1, further comprising in response to determining that a developmental stage of the resource has changed, automatically altering one or more properties of one or more of the resource.

7. The method of claim 6, wherein a property in the one or more properties of the resource is a version number of the resource or an office location of the second user associated with the resource.

8. A computer program product, encoded on one or more non-transitory computer storage media, comprising instructions that when executed by one or more data processing apparatus cause the one or more data processing apparatus to perform operations comprising:

identifying, by a data management system, an ownership privilege for a resource in a system that permits users to acquire a write lock on one or more resources in a plurality of resources, wherein users that do not have the ownership privilege for the resource cannot acquire the write lock on the resource, wherein the ownership privilege for the resource is associated with a first owner in a first geographic region;

receiving, by the data management system, a request for the write lock on the resource from a second owner in a different second geographic region;

determining that the second owner in the different second geographic region does not have the ownership privilege;

in response to determining that the second owner does not have the ownership privilege, adding the second owner to a queue of users who have requested the write lock for the resource without having ownership privileges for the resource;

determining, by the data management system, that a developmental stage of the resource has changed from a first stage associated with the first owner in the first geographic region to a second stage associated with the different second owner in the different second geographic region;

in response to determining that the developmental stage of the resource has changed, automatically revoking the ownership privilege for the first owner in the first geographic region;

determining that the second owner is next in the queue of users who have requested the write lock for the resource without having ownership privileges for the resource;

in response to determining that the second owner is next in the queue of users who have requested the write lock for the resource without having ownership privileges for the resource, automatically granting the ownership privilege to the second owner in the different second geographic region;

receiving a request for the write lock on the resource from the first owner, wherein the request for the write lock is a request for the write lock on the resource for which the write lock has not been acquired by another user;

determining that the first owner does not have the ownership privilege; and in response to determining that the first owner does not have the ownership privilege, denying the request for the write lock on the resource from the first owner and adding the first owner to the queue of users who have requested the write lock for the resource without having ownership privileges for the resource.

9. The computer program product of claim 8, wherein the operations further comprise:

receiving a request for the write lock on the resource from the second user;

determining that the second user has the ownership privilege; and in response to determining that the second user has the ownership privilege, granting the request for the write lock on the resource to the second user.

10. The computer program product of claim 8, wherein the ownership privilege for the resource is an ownership privilege for an attribute of the system.

11. A system comprising:

one or more data processing apparatus and one or more storage devices storing instructions that are operable, when executed by the one or more data processing apparatus, to cause the one or more data processing apparatus to perform operations comprising:

identifying, by a data management system, an ownership privilege for a resource in a system that permits users to acquire a write lock on one or more resources in a plurality of resources, wherein users that do not have the ownership privilege for the resource cannot acquire the write lock on the resource, wherein the ownership privilege for the resource is associated with a first owner in a first geographic region;

receiving, by the data management system, a request for the write lock on the resource from a second owner in a different second geographic region;

determining that the second owner in the different second geographic region does not have the ownership privilege;

in response to determining that the second owner does not have the ownership privilege, adding the second owner to a queue of users who have requested the write lock for the resource without having ownership privileges for the resource;

determining, by the data management system, that a developmental stage of the resource has changed from a first stage associated with the first owner in the first geographic region to a second stage associated with the different second owner in the different second geographic region;

in response to determining that the developmental stage of the resource has changed, automatically revoking the ownership privilege for the first owner in the first geographic region;

determining that the second owner is next in the queue of users who have requested the write lock for the resource without having ownership privileges for the resource;

in response to determining that the second owner is next in the queue of users who have requested the write lock for the resource without having ownership privileges for the resource, automatically granting the ownership privilege to the second owner in the different second geographic region;

receiving a request for the write lock on the resource from the first owner, wherein the request for the write lock is a request for the write lock on the resource for which the write lock has not been acquired by another user;

determining that the first owner does not have the ownership privilege; and in response to determining that the first owner does not have the ownership privilege, denying the request for the write lock on the resource from the first owner and adding the first owner to the queue of users who have requested the write lock for the resource without having ownership privileges for the resource.

12. The system of claim 11, wherein the operations further comprise:

receiving a request for the write lock on the resource from the second user;

determining that the second user has the ownership privilege; and in response to determining that the second user has the ownership privilege, granting the request for the write lock on the resource to the second user.

13. The system of claim 11, wherein the ownership privilege for the resource is an ownership privilege for an attribute of the system.

\* \* \* \* \*